(12) United States Patent
Fabbrizio et al.

(10) Patent No.: US 6,269,352 B1
(45) Date of Patent: Jul. 31, 2001

(54) LOW-VOLTAGE, VERY-LOW-POWER CONDUCTANCE MODE NEURON

(75) Inventors: Vito Fabbrizio, Piacenza (IT); Gianluca Colli, Santa Clara; Alan Kramer, Berkeley, both of CA (US)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/461,674

(22) Filed: Dec. 14, 1999

Related U.S. Application Data

(63) Continuation of application No. 08/731,426, filed on Oct. 15, 1996, now Pat. No. 6,032,140.

(30) Foreign Application Priority Data

Oct. 13, 1995 (EP) .................................................. 95830433

(51) Int. Cl.[7] .................................................. G06F 15/18
(52) U.S. Cl. .............................................................. 706/15
(58) Field of Search .................................. 706/15, 16, 25, 706/26, 27, 33, 38

(56) References Cited

U.S. PATENT DOCUMENTS

| 4,956,564 | 9/1990 | Holler et al. | 307/201 |
| 4,961,002 | 10/1990 | Tam et al. | 395/24 |

(List continued on next page.)

FOREIGN PATENT DOCUMENTS 0 349 007   1/1990   (EP) .

OTHER PUBLICATIONS

Lee et al., "Analog Floating–Gate Synapses for General–Purpose VLSI Neural Computation," IEEE Transactions on Circuits and Systems, vol. 38, No. 6, pp. 654–658, Jun. 1991.*

White et al., "Electrically Modifiable Nonvolatile Synapses for Neural Networks," IEEE International Symposium on Circuits and Systems, vol. 2, pp. 1213–1216, May 1989.*

Mizugaki et al., "Implementation of New Superconducting Neural Circuits using Coupled SQUIDs," IEEE Transcriptions on Applied Superconductivity, vol. 4, No. 1, pp. 1–8, Mar. 1994.*

Kramer et al., "EEPROM Device as a Reconfigurable Analog Element for Neural Networks," International Electron Devices Meeting, 1989. Technical Digest, pp. 259–262, Dec. 1989.*

Sze, S.M., *Physics of Semiconductor Devices*, 2 ed., Wiley, 1981, p. 403.

(List continued on next page.)

Primary Examiner—Mark R. Powell
(74) Attorney, Agent, or Firm—Theodore E. Galanthay; E. Russel Tarleton; Seed IP Law Group PLLC

(57) ABSTRACT

A neural network including a number of synaptic weighting elements, and a neuron stage; each of the synaptic weighting elements having a respective synaptic input connection supplied with a respective input signal; and the neuron stage having inputs connected to the synaptic weighting elements, and being connected to an output of the neural network supplying a digital output signal. The accumulated weighted inputs are represented as conductances, and a conductance-mode neuron is used to apply nonlinearity and produce an output. The synaptic weighting elements are formed by memory cells programmable to different threshold voltage levels, so that each presents a respective programmable conductance; and the neuron stage provides for measuring conductance on the basis of the current through the memory cells, and for generating a binary output signal on the basis of the total conductance of the synaptic elements.

6 Claims, 8 Drawing Sheets

U.S. PATENT DOCUMENTS

| | | | |
|---|---|---|---|
| 4,988,891 | 1/1991 | Mashiko | 395/25 |
| 5,004,932 | 4/1991 | Nejime | 307/201 |
| 5,021,693 | 6/1991 | Shima | 327/357 |
| 5,021,988 | 6/1991 | Mashiko | 395/24 |
| 5,053,638 | 10/1991 | Furutani et al. | 395/24 |
| 5,056,037 | 10/1991 | Eberhardt et al. | 364/513 |
| 5,101,361 * | 3/1992 | Eberhardt | 706/25 |
| 5,146,602 | 9/1992 | Holler et al. | 395/23 |
| 5,150,450 * | 9/1992 | Swenson et al. | 706/25 |
| 5,155,377 * | 10/1992 | Castro | 706/33 |
| 5,155,802 | 10/1992 | Mueller et al. | 395/24 |
| 5,187,680 | 2/1993 | Engeler | 364/807 |
| 5,202,956 * | 4/1993 | Mashiko | 706/39 |
| 5,248,956 * | 9/1993 | Himes et al. | 338/334 |
| 5,256,911 | 10/1993 | Holler et al. | 307/201 |
| 5,258,657 * | 11/1993 | Shibata et al. | 326/35 |
| 5,268,320 | 12/1993 | Holler et al. | 438/591 |
| 5,274,746 | 12/1993 | Mashiko | 395/27 |
| 5,298,796 | 3/1994 | Tawel | 395/25 |
| 5,299,286 * | 3/1994 | Imondi et al. | 706/37 |
| 5,305,250 * | 4/1994 | Salam et al. | 708/801 |
| 5,336,937 | 8/1994 | Sridhar et al. | 395/24 |
| 5,343,555 | 8/1994 | Yayla et al. | 395/24 |
| 5,396,581 | 3/1995 | Mashiko | 395/24 |
| 5,422,982 * | 6/1995 | Pernisz | 706/33 |
| 5,444,821 | 8/1995 | Li et al. | 395/24 |
| 5,475,794 | 12/1995 | Mashiko | 395/24 |
| 5,509,105 | 4/1996 | Roenker et al. | 395/24 |
| 5,615,305 | 3/1997 | Nunally | 395/24 |
| 5,704,014 * | 12/1997 | Marotta et al. | 706/33 |
| 6,032,140 * | 2/2000 | Fabbrizio et al. | 706/15 |

OTHER PUBLICATIONS

Jain, Jaswant R. and Anil K. Jain, "Displacement Measurement and Its Application in Interframe Image Coding," *IEEE Transactions on Communications* 29(12):1799–1808, Dec. 1981.

Degrauwe et al., "A Micropower CMOS–Instrumentation Amplifier," *IEEE J. of Solid–State Circuits* 20(3):805–807, Jun. 1985.

Sage et al., "An Artificial Neural Network Integrated Circuit Based on MNOS/CCD Principles," Proc. Conf. Neural Networks for Computing, J.S. Denker (ed.), Amer. Inst. of Physics, Snowbird, UT, 1986, pp. 381–385.

Graf et al., "A CMOS Associative Memory Chip," Proc. IEEE First International Conference Neural Networks, M. Caudill and C. Butler (ed.), SOS Printing, San Diego, CA, 1987, pp. III–461–III–468.

Seevinck, Evert and Roelof F. Wassenaar, "A Versatile CMOS Linear Transconductor/ Square–Law Function Circuit," *IEEE J. of Solid–State Circuits* 22(3):366–377, Jun. 1987.

Holler et al., "An Electrically Trainable Artificial Neural Network (ETANN) With 10240 'Floating Gate' Synapses," Proc. IJCNN, pp. 2.191–2.196, Jun. 1989.

Kramer et al., "EEPROM Device as a Reconfigurable Analog Element For Neural Networks," *IEDM Tech. Digest*, pp. 10.3.1–10.3.4, Dec. 1989.

Graf, Hans Peter and Don Henderson, "A Reconfigurable CMOS Neural Network," *IEEE ISSCC*, pp. 144–145, Feb. 1990.

Hollis, Paul W. and John J. Paulos, Artificial Neural Networks Using MOS Analog Multipliers, *IEE J. of Solid–State Circuits* 25(3):849–855, Jun. 1990.

Boser et al., "An Analog Neural Network Processor With Programmable Topology," *IEEE J. of Solid–State Circuits* 26(12):2017–2025, Dec. 1991.

Satyanarayana et al., A Reconfigurable VLSI Neural Network, *IEEE J. of Solid–State Circuits* 27(1):67–81, Jan. 1992.

Chandrakasan et al., "Low–Power CMOS Digital Design," *IEEE J. of Solid–State Circuits* 27(4):473–484, Apr. 1992.

Sin et al., "EEPROM as an Analog Storage Device, With Particular Applications in Neural Networks," *IEEE Transactions on Electron Devices* 39(6):1410–1419, Jun. 1992.

Tsukano et al., "A New CMOS Neuron Circuit Based on a Cross–Coupled Current Comparator Structure," *IEICE Transactions on Fundamentals of Electronics* E75–A(7):937–943, Jul. 1992.

Costto, E. and H.P. Graf, "NET32K High Speed Image Understanding System," Proc. Fourth International Conference on Microelectronics for Neural Networks and Fuzzy Systems, IEEE Computer Society Press, Los Alamitos, CA, 1994, pp. 413–421.

Guardiani et al., "Applying a submicron mismatch model to practical IC design," Proc. of the CICC, pp. 13.3.1–13.3.4, 1994.

Lazzaro et al., "Systems Technologies for Silicon Auditory Models," *IEEE Micro* 14(3): 7–15, Jun. 1994.

König et al., Massively Parallel VLSI–Implementation of a Dedicated Neural Network for Anomaly Detection in Automated Visual Quality Control, *Proc. Microneuro*, pp. 354–364, Sep. 1994.

Kramer et al., "Flash–Based Programmable Nonlinear Capacitor for Switched–Capacitor Implementations of Neural Networks," *IEDM Tech. Dig.*, pp. 17.6.1–17.6.4, Dec. 1994.

Kovács–V., Zsolt M. and Roberto Guerrieri, "Massively–Parallel Handwritten Character Recognition Based on the Distance Transform," *Pattern Recognition* 28(3):293–301, 1995.

Kramer et al., "Ultra–Low–Power Analog Associative Memory Core Using Flash–EEPROM–Based Programmable Capacitors," Proc. 1995 International Symposium on Low Power Design, Association for Computing Machinery, Dana Point, CA, 1995, pp. 203–208.

Fabbrizio et al., "Low Power, Low Voltage Conductance–Mode CMOS Analog Neuron," *Proc. of MicroNeuro*, pp. 111–115, 1996.

Tomasini et al., "B/W Adaptive Image With Analog Motion Vector Estimator at 0.3GOPS," *ISSCC Dig. Of Tech Papers*, pp. 94–95, 425, 1996.

Fabbrizio et al., "Low Power, Low Voltage Conductance–Mode CMOS Analog Neuron," *Proc. of MicroNeuro '96*, pp. 111–115, Feb. 1996.

Benson et al., "UV–Activated Conductances Allow for Multiple Time Scale Learning," IEEE Transactions on Neural Networks, vol. 4, No. 3, pp. 434–440, May 1993.

* cited by examiner

LOW-VOLTAGE, VERY-LOW-POWER CONDUCTANCE MODE NEURON

CROSS-REFERENCE TO RELATED APPLICATION

This application is a continuation of U.S. patent application Ser. No. 08/731,426 filed Oct. 15, 1996 and allowed Sept. 13, 1999 now U.S. Pat. No. 6,032,140.

TECHNICAL FIELD

The present invention relates to a low-voltage, very-low-power conductance mode neuron.

BACKGROUND OF THE INVENTION

As is known, artificial intelligence systems feature neural networks for performing complex tasks, in particular, for texture analysis, morphological kernel filtering in facsimile transmission, vehicle tracking systems, pattern recognition, hardware simulation in neural CAD systems, and preprocessing in optical character recognition applications.

Neural networks employ components known as neurons, similar to the biological elements of the same name and based on the addition and subtraction of appropriately weighted inputs, and for which various mathematical formalisms have been devised. Reference is made in the present invention to binary neurons according to the McCulloch-Pitts model, which stands out for the precision and elegance of its mathematical definition, and according to which, the output may assume only two binary values "0" and "1" and operates under a discrete time assumption, with predetermined neuron thresholds and weights. Each neuron comprises a processing element with a number of synaptic input connections and one output; and input and output signal flow is considered one-way.

In the classification phase neural network parameters are fixed and the neural network executes the recognition or the analysis starting from the information contained in the topology and in the weights of the neural network. FIG. 1 shows a symbolic representation of the McCulloch-Pitts model, in which $x_1, x_2, \ldots, x_i$ are the inputs, $w_1, w_2, \ldots, w_i$ the weights, and O the output. The neuron is represented by a node defining function f, which, when applied to the weighted inputs, supplies the output according to the equation:

$$O = f(\Sigma w_i * x_i)$$

Typically, the f function compares the sum of the weighted products of the inputs with a threshold, and, depending on the outcome of the comparison, determines the binary value of the output.

Various solutions are known for implementing neural networks, as described for example in S. Satyanarayana et al., "A Reconfigurable VLSI Neural Network," *IEEE Journal of Solid-State Circuits* 27:1, January 1992; B. E. Boser et al., "An Analog Neural Network Processor with Programmable Topology," *IEEE Journal of Solid-State Circuits* 26:12, December 1991; and A. Kramer et al., "EEPROM Device As a Reconfigurable Analog Element for Neural Networks," IEDM, 1989, pp. 259–262.

All known solutions, however, involve a trade-off between power consumption and precision, require a large integration area, and are complex in design. Moreover, all known prior art solutions make it necessary to choose between solutions designed for high speed but requiring high power (current mode computation) and solutions designed for low power but operating at low speed (charge computation mode).

Analog implementations of Neural Network Architectures provide a framework for computation which is more efficient than standard digital techniques for certain problems. Typically, implementations of analog neural networks have been based on the use of either current or charge as the variable of computation.

SUMMARY OF THE INVENTION

The present invention provides a new class of analog neural network circuits based on the concept of conductance-mode computation. In this class of circuits, accumulated weighted inputs are represented as conductances, and a conductance-mode neuron is used to apply nonlinearity and produce an output. In the hardware implementation of neural networks it is important to consider flexibility and power consumption in order to satisfy a wide range of applications. The present invention has been to focus on circuits which consume very little power per connection allowing for a high number of connections per neuron.

It is an object of the present invention to provide a compact, low-power neural network with a high input range that operates at high speed. It is adaptable to different (even low-voltage) supply conditions and it requires no additional interfacing to be compatible with digital environments. It may also be used in portable devices.

One advantage of the present invention is that it implements synapses by a simple circuit based on a pair of floating-gate transistors, providing both analog multiplication and weight storage with low power consumption, high density and high precision. Both the weight storage and analog multiplication are implemented concurrently in a pair of floating gate transistors.

The advantages of this class of circuits are twofold: firstly, conductance-mode computation is fast - circuits based on these principles can compute at about 5–10 MHz; secondly, because conductance-mode computation requires the minimum charge necessary to compare two conductances, its energy consumption is self-scaling depending on the difficulty of the decision to be made. The computing precision of these circuits is high. Test results on a small test structure indicate an intrinsic precision of 8–9 bits.

A preferred, non-limiting embodiment of the present invention will be described by way of example with reference to the accompanying drawings.

DETAIL DESCRIPTION OF THE INVENTION

The present invention uses a single pair of Flash-EEPROM devices for both analog storage and analog computation. Basically, the computational concept is to make use of a floating-gate device as a programmable switched conductance. By storing one analog value as the threshold of a floating gate device and applying a second digital value on a gate terminal of the floating-gate device, the conductance of the device can be either zero (oft) or a pre-programmed analog value. In this way, a single programmable device is able to implement a multiplication of a single binary value (Vg of progranunable transistor) by an analog value ($V_{High}-V_{Th}$). The single programmable device is a conductance synapse whose weight is computed by the neuron when the input is taken high.

Figure 1:
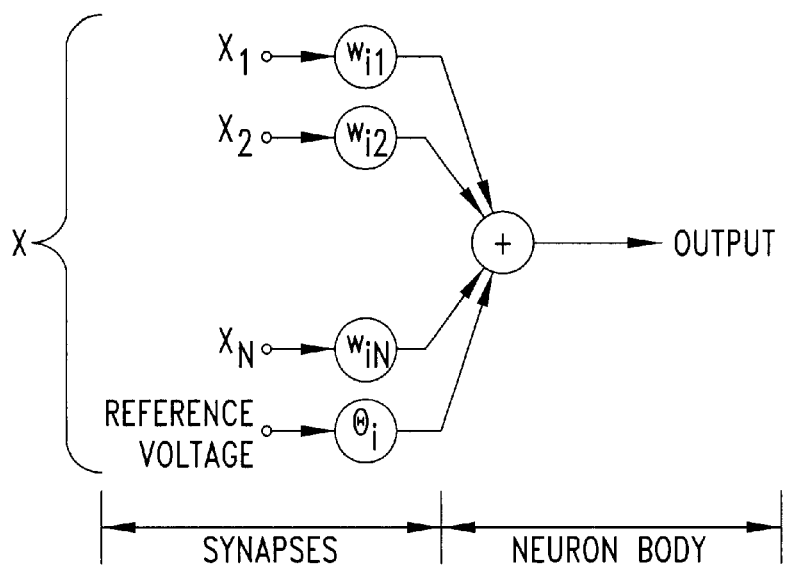
FIG. 1 shows a symbolic representation of a neuron according to the McCulloch-Pitts model.
Figure 2:
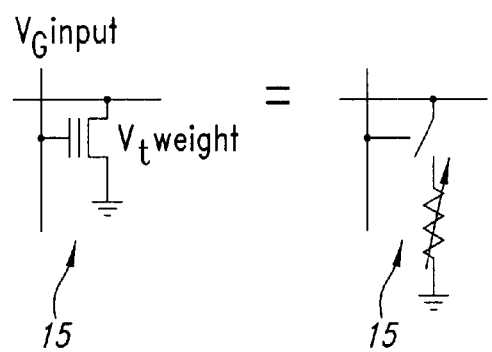
FIG. 2 is a schematic showing use of a flash EEPROM device as it will function as a programmable, switched conductance.
Figure 3:
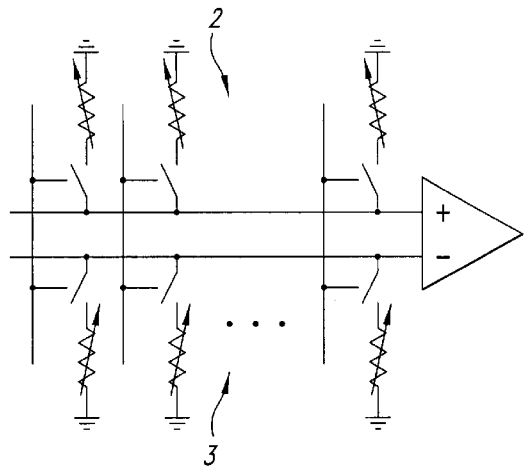
FIG. 3 is a schematic of a differential, summed synaptic conductance neuron.

In one implementation, a differential input scheme comprising two conductance summing lines allows weights to be stored in the form of a pair of conductances. The weights are either "positive" or "negative." For each two transistor synapse, one device is programmed to be always off, independent of input, and the other device is programmed to be on only when the input is high. Synapse polarity (positive or negative) is determined by which summing line to which the on device is connected. A conductance comparison neuron can then compare the sum of the total "positive" conductance to the sum of total "negative" conductance and make a decision on the polarity of the total weighted inputs (conductance). A binary output is provided whose value is base on the results of the comparison FIG. 3 shows a schematic of a electrical representation of such a conductance neuron device's functionality. Each collection of the total "positive" conductance devices 2 or the total "negative" conductance devices 3 constitutes the synapses of a neuron. The conductance or weights of these synapses are determined by a threshold voltage (Vt) programmed on the neuron. The precision to which this threshold voltage can be controlled gives the effective bit-equivalent precision of the synapse weight.

The analog programmed value is controlled by the programmed threshold voltage. In this embodiment, the actual value is equal to the digital on voltage, $V_H$, minus the $V_T$. $V_T$ is programmed to a value as selected by the user, a control circuit, or a program. These values can be provided by any number of accepted techniques, including via a hardware data transfer, software program, or internal adaptation. The internal adaptation may occur by use of neural algorithms implemented or feedback loops on the same chip so that self programming and modification can be controlled on a single chip without need for a host processor.

It is possible to program the threshold of a floating-gate device to a precision in the range of 8 mV to 64 mV. Of course, future improvements in programming and storage technology may permit long term storage of even more precision. This corresponds to 8 bits to 5 bits (256 to 32 levels) over a 2V input dynamic range. While current technology will permit flash EEPROMs to be used for long term storage, up to one year for 5 mV to 8 mV threshold variations, and for 64 mV variations up to 10 years, other conductance storage devices may be used. Usage of two devices adds an additional sign bit to increase the total to 9 to 6 bits per weight.

The present invention uses a conductance comparator as a neuron to apply the "activation function" of the neuron that converts the total analog conductance input to a binary voltage output suitable for long range communication and digital analysis. Directly comparing two conductances allows the present invention to compute using very little energy, reducing the overall power consumption.

Figure 4A:
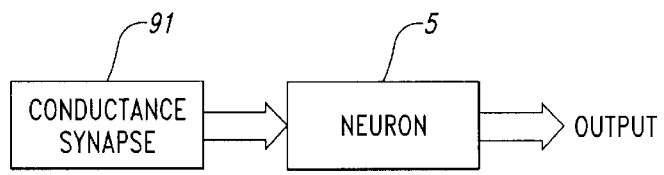
FIG. 4A is a block diagram of the principle blocks of the present invention.
Figure 4B:
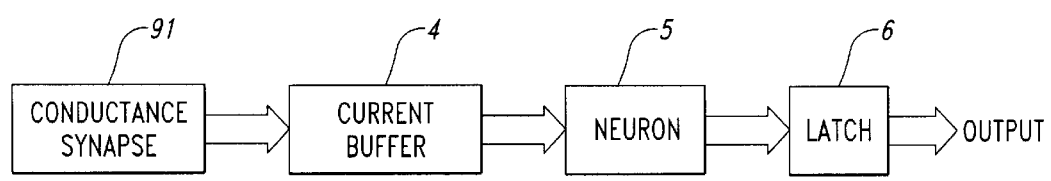
FIG. 4B is a block diagram of the present invention.

FIG. 4A illustrates a circuit that performs the neuron computation. The circuit is a conductance measuring device that comprising two principal blocks: conductance synapses 91 and a neuron 5. FIG. 4B shows a current buffer 4 decoupling the synapses 91 from the neuron 5 where the neuron performs the comparison of conductance of the synapse 91. The circuit may also include a latch 6 to digitize an output of the circuit. In one embodiment of FIG. 4A and 4B, each conductance synapse is composed of a single conduction element whereas in n alternative embodiment, each conduction synapse is composed of two conduction elements.

Figure 4C:
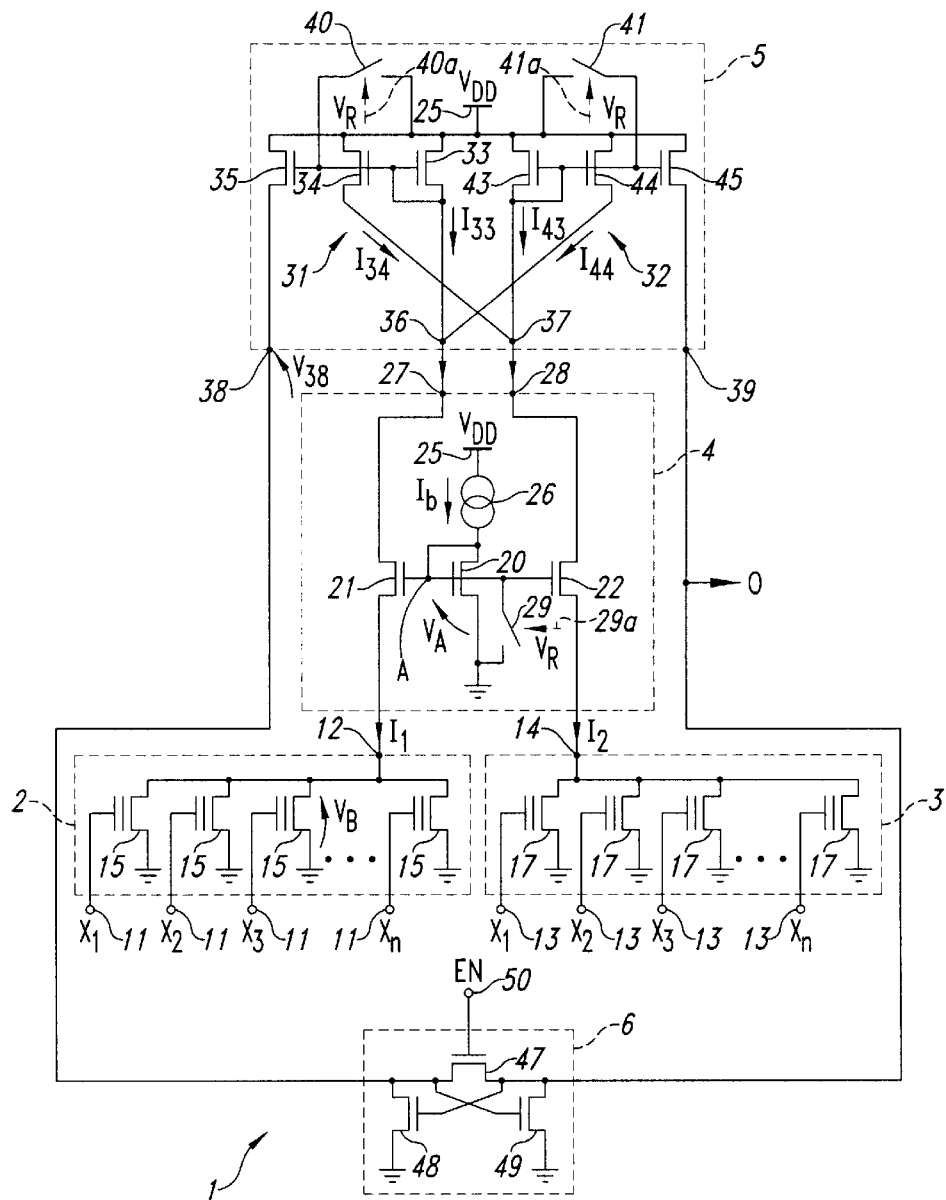
FIG. 4C shows an overall circuit diagram of a neural network circuit according to the present invention.
Figure 5:
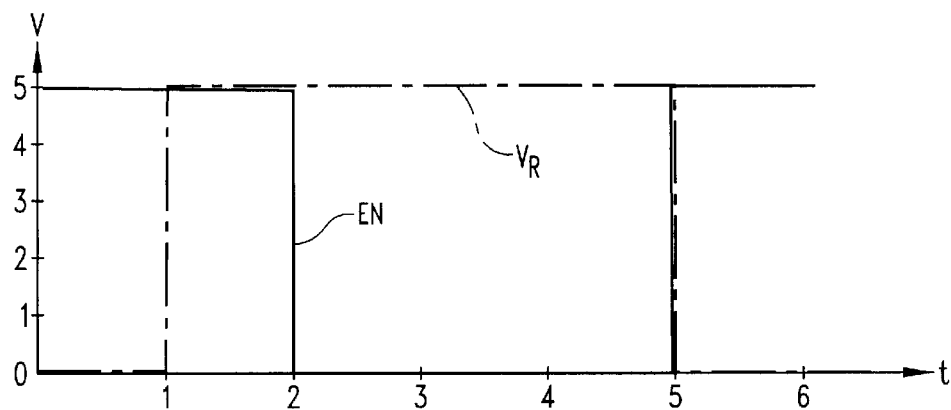
FIGS. 5 to 7 show plots of a number of quantities of the circuit in FIG. 4C.

FIG. 4C indicates a neural network 1 comprising a first exciting (positive-weighted) synapse block 2; a second inhibiting (negative-weighted) synapse block 3; a decoupling stage (buffer) 4; a comparing stage (neuron) 5; and a latch circuit 6.

Synapse block 2 has a number (n) of inputs 11 supplied with (n) input signals $x_1, x_2, \ldots, x_n$; a set of (n) positive value synapses 15; and an output 12 which is the sum of the current through all positive synapses through which flows current $I_1$. Synapse block 3 comprises an equal number of inputs 13 supplied with the same n input signals (each input signal is supplied in parallel to an input 11 of exciting synapse block 2, and to an input 13 of inhibiting synapse block 3); a set of (n) negative values synapses 17; and an output 14 through which flows current $1_2$.

In this embodiment, the synapses 91 are implemented with a positive-weighted synapse block 2 and a negative-weighted synapse block 3; however, other conduction schemes within the context of the present invention use only one type of weighted synapses. While certain advantages are obtained using positive and negative synapses in a comparison mode, this is not required in all implementations making use of the present invention.

Synapse block 2 comprises a number of synaptic elements 15 comprising memory cells 15—in this case flash-EEPROM cells—of the same number as inputs 11. More specifically, each synapse cell 15 has a grounded source terminal, a gate terminal connected to a respective input 11, and a drain terminal connected to the drain terminals of the other cells 15 and to output 12. Similarly, synapse block 3 comprises a number of synaptic elements comprising memory cells 17 (of the same number as cells 15); and each cell 17 has a grounded source terminal, a gate terminal connected to a respective input 13, and a drain terminal connected to the drain terminals of the other cells 17 and to output 14. As can be seen by viewing FIG. 4C, the sources of each conductance element 15 and 17 are tied to a common voltage potential, which in one embodiment is ground.

Flash-EEPROM memory cells are used for cells 15 and 17 is one embodiment of the present invention. The use of floating gate technology for efficient long term analog storage is well known in the art, especially in neural network implementations. See, for example, an article by A. Kramer et al., entitled "Flash-based Programmable Nonlinear Capacitor for Switch Capacitor Implementations for Neural Network," *IEDM Technology Digest,* pp. 17.6.1–17.6.4, December 1993. However, other possible conductance storage devices, such as EEPROM memory cells, dynamic floating gate devices, non-programmable, non-floating gate devices (i.e., standard MOS transistors of selected size) or other types of storage elements suitable for generating conductance, are used in other embodiments.

Referring to FIG. 4C, decoupling stage or buffer 4 comprises a first diode-connected N-channel MOS transistor 20, and a second and third N-channel MOS transistor 21, 22. More specifically, first transistor 20 has the drain terminal connected to a supply line 25 at supply voltage $V_{DD}$ via a current source 26 for generating current $I_b$; the gate terminal (node A) connected to its own drain terminal and to the gate terminal of transistors 21, 22; and the source terminal grounded. Second transistor 21 has the source terminal connected to output 12 of synapse block 2, and a drain terminal defining a first output 27 of buffer 4. Third transistor 22 has the source terminal connected to output 14 of synapse block 3, and a drain terminal defining a second output 28 of buffer 4.

A reset transistor (represented in FIG. 4C by a switch 29) is located between the gate and source terminals of transistor 20, and presents a control input 29a. In the presence of a control signal at input 29a (voltage $V_R$), switch 29 grounds the gate terminals of transistors 20–22, and hence the drain terminals of memory cells 15, 17, to eliminate the current through the memory cells when network 1 is not used.

Neuron 5 comprising a conductance comparator which senses the difference between the synapse blocks 2 and 3 separated in positive and negative weights. This conductance mode neuron is a suitable building block for large-scale array-based analog neural network implementation and has been designed using a mixture of analog and digital subcircuits (mixed-mode). The neuron circuit uses analog weighting and analog computation internally to reduce silicon area and power consumption while its data inputs and outputs are digital. One of the concepts underlying the present invention is to make use of conductance summing for performing computation and for converting an analog-valued conductance signal into a binary-valued output signal suitable for communication. The use of digital I/O signals greatly simplifies integration at the system level. In one embodiment, the I/O is digital; but, alternatively analog I/O may be used.

Neuron 5 comprises a symmetrical first and second section 31, 32 connected respectively to outputs 27, 28 of buffer 4 and cross-connected to each other. Section 31 comprises three P-channel MOS transistors 33–35 with the source terminals all connected to supply line 25, and the gate terminals connected to one another; transistor 33 is diode-connected, forms a current mirror with transistors 34, 35, and has the drain terminal connected to a node 36 in turn connected to output 27 of buffer 4; transistor 34 has the drain terminal connected to a node 37 of section 32; and the drain terminal of transistor 35 forms output 38 of the neuron, and is connected to latch circuit 6.

Similarly, section 32 comprises three P-channel MOS transistors 43–45 with the source terminals all connected to supply line 25, and the gate terminals connected to one another, transistor 43 is diode-connected, forms a current mirror with transistors 44, 45, and has the drain terminal connected to node 37 in turn connected to output 28 of buffer 4; transistor 44 has the drain terminal connected to node 36 of section 31; and the drain terminal of transistor 45 forms output 39 of the neuron, and is connected to latch circuit 6.

Reset transistors (represented in FIG. 4C by switches 40, 41) are located between supply line 25 and the gate terminals of transistors 33–35 and 43–45 respectively, and present control inputs 40a, 41a. In the presence of control signals at inputs 40a, 41a (voltages VR), switches 40 and 41 short the gate terminals of transistors 33–35 and 44–45 to the supply and so turn off the transistors when network 1 is not used.

Latch circuit 6 is a conventional type comprising three N-channel MOS transistors 47–49. More specifically, transistor 47 has the source and drain terminals connected to outputs 38, 39 of neuron 5, and the gate terminal forms a control input 50 supplied with an enabling signal EN; transistor 48 has the drain terminal connected to output 38 of neuron 5, the gate terminal connected to output 39 of neuron 5, and the source terminal grounded; and transistor 49 has the drain terminal connected to output 39 of neuron 5, the gate terminal connected to output 38 of neuron 5, and the source terminal grounded.

A single synapse can be viewed as being comprised of one synapse element 15 from block 2 and one synapse element 17 from 7. These two synapse elements have a common input and form a single synapse together. As previously stated, in a preferred embodiment, one of these elements will be programmed on to the desired conductance value when the input is high and the other will be programmed to always be off, regardless of the input value. The conductance of respective elements 15 will be summed to provide a positive conductance signal and the conductance of respective elements 17 will be summed to provide a negative conductance signal. These are compared to provide a binary output, the comparison being one technique to provide a fast computation.

Of course, the conductance synapses of this invention could also be composed of a single conductive element for each synapse, whose value is computed upon an input signal being provided. This could be implemented, for example, by using only a single block 2 and compare the output to some reference value for a digital output; or alternatively, to provide the neuron output as an analog output. Alternatively, a synapse comprised of two devices as generally described can be programmed so that both devices are on when the input is high. In this case, the conductance value of the synapse corresponds to the difference in conductance value between the two elements. This embodiment can be useful in providing a circuit which is more insensitive to the effects of temperature variations on effective threshold voltage. In a further alternative, rather than comparing the conductance value with respect to ground, elements 15 and 17 could have their respective sources tied to a respective selected voltage potential other than ground. In one embodiment, all the elements 15 of block 2 are tied to a first selected voltage potential and all elements of block 3 to a different selected voltage potential. This could provide increased differences in the output signals for improved conductance measurement comparison. Thus, while, the conductances are shown measured with respect to ground in FIG. 4C, they are measured with respect to any selected fixed voltage, including different voltages for different individual elements 15 and 17, or entire groups of elements within blocks 2 and 3.

In one embodiment, each synapse is a single conductance element implemented by floating-gate or other storage devices. In an alternative embodiment, each synapse is a pair of conduction elements implemented by a differential pair of floating gate devices. This presents several design constraints to the current buffer. Firstly, to minimize disturb programming it is helpful to keep the drain voltage of the floating-gate device of the synapse as low as possible. In one embodiment, this is less that 100 mV, but higher voltages could be used in other technologies or designs. Secondly, as the present invention intended to use many synapses and each has parasitic drain capacitance on the order of 2 fF, the drain terminal of the synapse will respond slowly if it must undergo large voltage swings. To have a neuron with a large dynamic range output voltage and high speed, it is desirable to decouple the drain node of the synapses from the neuron.

The number of synapses per neuron can be any number in one embodiment there are from 1 to 2000 memory cells 15 and 17 in each of synapse blocks 2 and 3.

One advantage of the present invention is that it can correctly and rapidly compare the synaptic conductances, even in the presence of a large common mode conductance. Common mode conductance corresponds to that part of the signal which is conductive for both the negative and positive conductance summing lines. The difference conductance signal corresponds to the residual conductance present on either the positive or negative summing line, whichever is greater. The common mode conductance can vary over a wide range, from as few as no synapses on as common to as high as nearly all synapses on (i.e., 1000 or 2000). Compute precision corresponds to the residual conductance signal needed to correctly control neuron output in the presence of maximum common mode conductance.

Memory cells 15, 17 of synapse blocks 2, 3 of network 1 are programmed according to the weight $w_i$ they are to represent, and, more specifically, may be programmed at different threshold levels to present a given conductance for each input voltage value. In the simplest case, they may be programmed to define only two binary levels (cell on or off for a given input voltage value at inputs 11, 13 respectively), and the input voltage (input signals $x_1, \ldots, x_n$) may assume only a predetermined number of discrete values (e.g., two, binary high or low; or four). Alternatively, the cells may be programmed to store a number of different threshold values, and the input voltage may vary continuously within a predetermined range to actually evaluate the conductivity of the cells in the presence of data input signals.

Consequently, when input signals $x_1, \ldots, X_n$ are supplied to inputs 11, 13, the current through each of memory cells 15, 17 is related to the conductance of the cell, which is the programmed, stored weight. The current $I_1, I_2$ through each node 12, 14 equals the sum of the currents in all the cells of the respective synapse blocks 2, 3, and as such is related to the total conductance of the synapse.

Buffer 4 provides for decoupling, and more specifically for ensuring the neuron only sees the capacitance of transistors 21, 22 (the capacitance between the drain and gate terminals plus the capacitance between the drain and source terminals of transistors 21, 22) and not the total capacitance of cells 15, 17, which, in view of the large number of cells that may be provided (even as many as a few thousand synaptic elements per neuron), may be extremely high. This provides for much faster evaluation by network 1, as explained in more detail herein.

To reduce the power consumption in the computation it is better that all the devices implementing synapses work in the triode region. However, this is not always required. In the present invention, buffer 4 provides for maintaining a low voltage at outputs 12, 14 of synapse blocks 2, 3, so that memory cells 15, 17 operate in the triode region, and network I can also operate at low supply voltages and low power.

Operation of buffer 4 will now be described mathematically with reference to exciting summing line 12 from positive synapse block 2; the same also applies to inhibiting summing line 14 from inhibiting synapse block 3.

As the voltage drop between the source and gate terminals of a MOS transistor equals the threshold voltage (minimum voltage at which the transistor is turned on) plus the overdrive voltage (voltage in excess of the threshold value), the following equation applies for transistor 20:

$$V_A = V_{GS,20} = V_{OV,20} + V_{th,20} \qquad (1)$$

where $V_A$ is the voltage drop between node A and ground; and $V_{GS,20}$, $V_{OV,20}$ and $V_{th,20}$ are respectively the gate-source voltage drop, overdrive voltage and threshold voltage of transistor 20.

Moreover, if $V_B$ is the voltage drop between output 12 and ground (the voltage between the drain and source terminals of cells 15):

$$V_A - V_B = V_{GS,21} = V_{OV,21} + V_{th,21} \qquad (2)$$

where $V_{GS,21}$, $V_{OV,21}$ and $V_{th,21}$ are respectively the gate-source voltage drop, overdrive voltage and threshold voltage of transistor 21.

Since transistors fabricated using the same technology present roughly the same threshold voltage, so that $V_{th,20} \approx V_{th,21}$, substituting (1) in (2) with a few straightforward calculations gives:

$$V_B = V_{OV,20} - V_{OV,21} \qquad (3)$$

Transistor 21 may be appropriately sized to present a negligible overdrive voltage in relation to that of transistor 20, so that (3) becomes:

$$V_B \approx V_{OV,20} \qquad (4)$$

and the voltage between the drain and source terminals of cells 15 equals the overdrive voltage of transistor 20.

For transistor 20, which operates in the normal region, the following equation applies:

$$I_b = K(V_{GS,20} - V_{th,20})^2 = K(V_{OV,20})^2 \qquad (5)$$

where $I_b$ is the current through transistor 20 and equal to the current generated by source 26; and K is a proportion constant.

Substituting (4) in (5) with a few straightforward calculations gives:

$$V_B = \sqrt{I_b/K} \qquad (6)$$

Consequently, by appropriately sizing current source 26, the drain-source voltage drop of cells 15 (and 17) may be predetermined, and more specifically, may be made less than the gate-source voltage drop of cells 15.

Neuron 5 is a conductance sensing circuit that performs a comparison between two different conductances coming from the synapse devices. Neuron 5 provides for comparing the respective currents $I_1$ and $I_2$ of the exciting and inhibiting synapses, and, together with latch 6, for generating at output O (node 39) a digital signal, the value of which indicates which of the two currents is the higher. More specifically, it operates as a feedback current sensor, wherein a transient state is observed when the circuit is turned on, and at the end of which practically all the current flows into section 31 or 32 connected to the synapse with the higher output current, and the other section is practically turned off altogether. A digital output signal level is thus reached very quickly.

For an easy decision, namely, a large difference between the conductance values of blocks 2 and 3, the final digital output is reached very quickly with very low current consumption. Thus, even though many synapse elements may be turned on, the actual decision itself is based on a difference and thus is very quick and low in power if that difference is great. If the decision is difficult, namely, the value of currents $I_1$ and $I_2$ are nearly equal, slightly more time may be required to make the decision with slightly more current usage. Accordingly, the present invention provides the advantage that easy decisions are made quickly with low power consumption and the more difficult decisions are permitted the extra time needed to ensure a correct output.

To explain the working of neuron 5, currents $I_1$ and $I_2$ will be assumed to present a common term $I_c$, and to differ by a differential term $\Delta I$. For example, exciting synapse block 2 will be assumed to generate a current $I_1=I_c+\Delta I$, and inhibiting synapse block 3 to generate a current $I_2=I_c$.

When reset signal $V_R$ switches to eliminate the shorted condition of buffer 4 and neuron 5, cells 15, 17 begin drawing current, and currents $I_1$, and $I_2$ begin flowing through sections 31, 32 to turn them on. At this transient stage, however, the current mirrors of the two sections are not turned on at the same speed: the mirror connected to the lower-capacitance line (i.e., lower conductance—higher current) is turned on faster, so that, in the case in question, transistors 33 and 34 of section 31 are turned on faster than transistors 43 and 44, and begin drawing and supplying current more rapidly to node 37. More specifically, transistor 33 (and hence transistor 34) draw current $I_1=I_c+\Delta I$. As only current $I_2=I_c$ is required, however, from node 37, the excess portion supplied by transistor 34 tends to go to transistor 43, which, not supporting such a condition, begins to go off, and, at the same time, the voltage at node 37 rises to supply voltage $V_{DD}$.

On the other hand, when turned on, transistor 44 supplies current to node 36, thus reducing the current through transistor 33 and causing a brief variation in the current supplied by transistor 34 to node 37. On account of the cross-connection of sections 31 and 32, a sort of feedback is produced between them, which causes the 30 section connected to the higher-current synapse block (in this case, section 31) to supply practically all the current required by synapse blocks 2, 3, while the other section is practically turned off. In the case in question, therefore, at the end of the transient state, practically all of current $I_c+\Delta I$ flows into section 31, and only a negligible current flows into section 32. By using a cross mirror and positive feedback on the neuron, the present invention is able to subtract a common mode current and discriminate lines of synapses with a minimum conductance. This allows the circuit to achieve high precision over a wide range of input current. The speed of the circuit changes with the overall current, therefore, to optimize the speed performance and to digitize the output the present invention use a standard latch 6.

Figure 6:
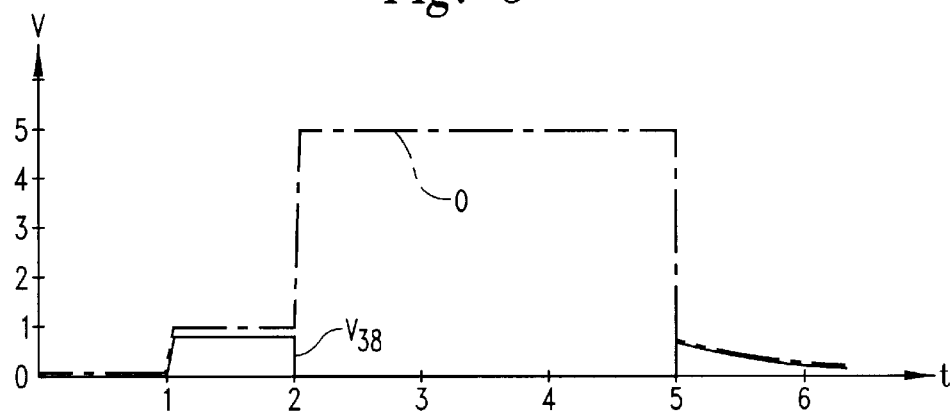
Figure 7:
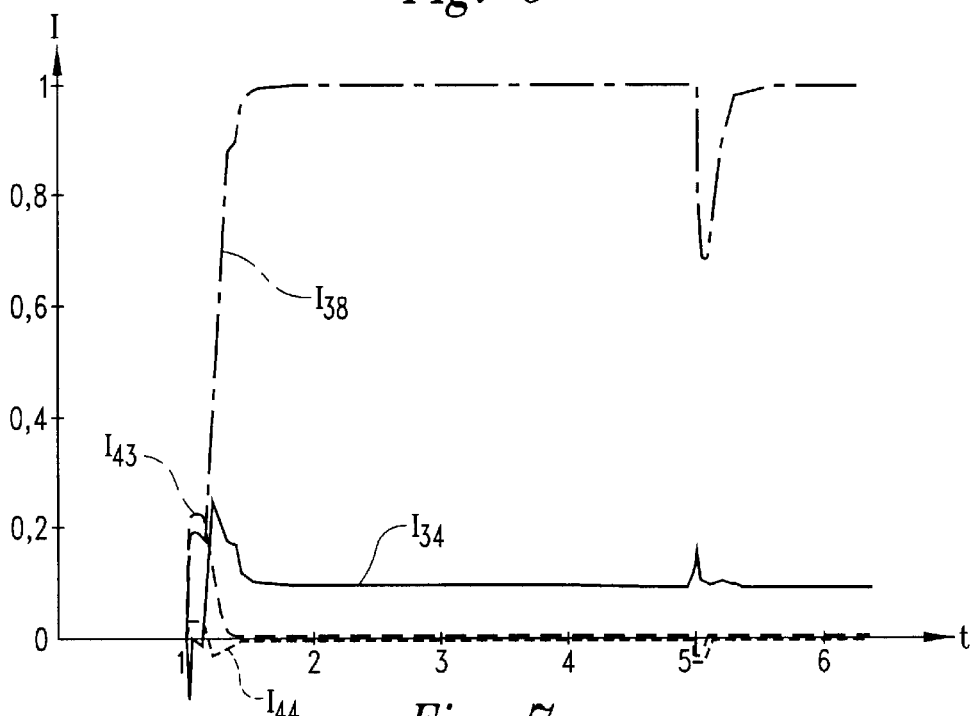

The FIG. 7 plots show the currents in transistors 33, 34, 43, 44, as determined in a simulation test conducted by the Applicant, upon switching of reset signals $V_R$ at the inputs of switches 29, 40, 41, and enabling of latch 6 (EN signal). As can be seen, at the end of the transient state, current $I_{33}$ equals $I_c+\Delta I$, current $I_{34}$ equals $I_c$, and currents $I_{43}$, $I_{44}$ are zero. The FIG. 6 graph shows output voltages O and at node 38 (voltage $V_{38}$).

The off state of the section connected to the lower-current synapse (section 32) disconnects the respective output node (39) from the supply; whereas the high-conductance condition of the section connected to the higher-current synapse (section 31) latches the respective output node (38) to supply voltage $V_{DD}$. Consequently, in the example shown, upon signal EN switching to low and turning off shorting transistor 47, transistor 49, whose gate terminal is connected to the turned-on section 31, is turned on and grounds output O; and the other transistor 48 remains off. Conversely, if inhibiting synapse block 3 presents a lower conductance (higher current) than exciting synapse block 2, section 32 and transistor 48 are turned on, and section 31 and transistor 49 are turned off, so that output O is high and latched to supply voltage $V_{DD}$ via transistor 45.

The advantages of the neural network according to the present invention are as follows. By implementing the synapses using memory cells whose conductance varies according to the programming level, the synapses may be so biased as to present a low output voltage (nodes 12, 14), thus permitting network 1 to be used in low-voltage conditions and hence also in portable devices and systems. Moreover, low-current operation of the synapses (100 pJ in the case of a thousand inputs) provides for low-power operation of the network as a whole, which may therefore also be used in applications in which voltage and power resources are limited.

Reducing the voltage at the drain terminals of cells 15, 17 also provides for preventing or minimizing soft-writing of the cells, thus ensuring a high degree of reliability of the network.

By virtue of the low current levels and buffer 4 decoupling the synapses and the neuron, the network provides for particularly high-speed evaluation.

Forming the neuron as a feedback conductance comparator, as described, provides for safely comparing even only slightly differing conductances in the synapses, and in particular conductances differing by even a few orders of magnitude less than the conductances themselves (e.g., with a ratio of 1:1000), by virtue of the differential value of the two conductances being used to off-balance neuron 5 and hence latch circuit 6.

The network according to the invention also presents a high input range, can discriminate up to 10 bits, requires a small integration area (200×32 $\mu$m) by using a 0.7 $\mu$m CMOS technology, presents a simple, easily integratable structure, and requires no interfacing with digital environments.

The present invention has further advantages as follows. The disclosed conductance mode computation causes a minimum current pulse in the summing node in order to make neuron decisions. In addition, by virtue of minimum current pulse as well as of fast computing time, a low power operation is obtained. The solution by the present invention has high precision, in particular the disclosed solution has a 9-bit inherent precision and a 7–8 bit measured precision.

Figure 8:
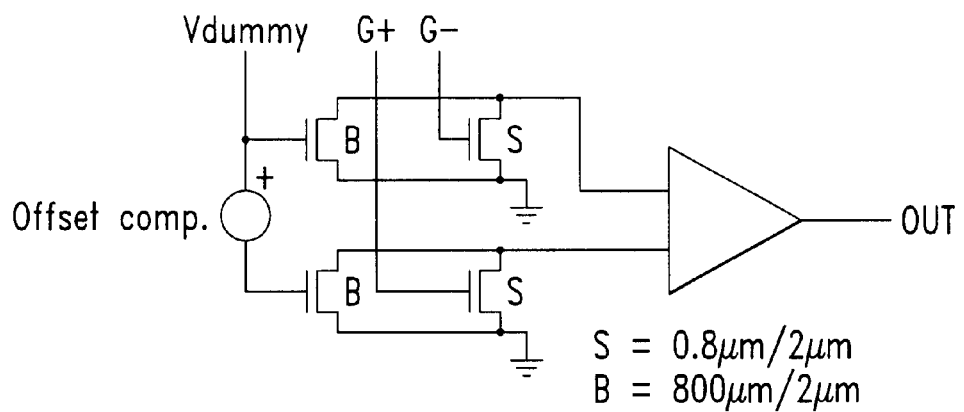
FIG. 8 shows a schematic of a test structure.

FIG. 8 shows a test structure of an implementation of the neuron. The test structure contains two pairs of transistors connected to the neuron. One pair of the transistors are very big (B=800 $\mu$m/2 $\mu$m) and represent the common mode signal for the positive and negative synapses; the other pair of transistors are small (S=0.8 $\mu$m/2 $\mu$m) like minimum flash devices and represents variable input signals. After offset compensation between the two large "common mode"

transistors, a common mode voltage is applied to both pairs of transistors and a minimum input signal needed to control the output via the pair of small transistors is measured.

Figure 10:
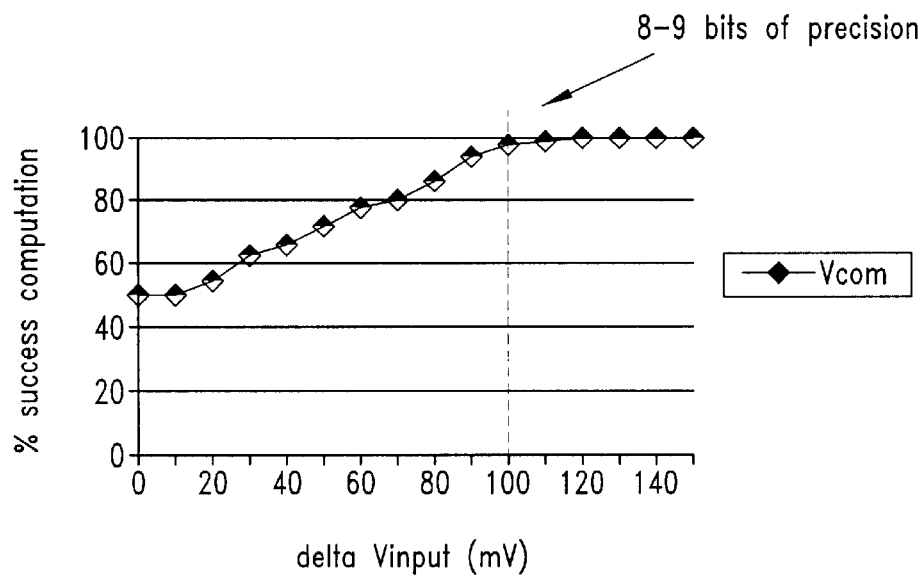
FIG. 10 shows an intrinsic precision curve of test structure.

A measurement was made to characterize the percentage of times the output was correctly controlled by the input over 1000 cycles using a "001100. . . " input pattern. With a maximum common mode voltage (Vcommon) fixed to 0.9 V (100–200 mV above Vt) the statistical output as a function of delta input voltage (Vinput) between the two "small" transistors is measured. FIG. 10 shows a loss of precision starting at Vinput=120 mV. The correspondence between this measurement and precision depends critically on the precise threshold voltage of the devices; for a process with Vt varying between 0.7 V and 0.8 V which in the worst case means 8 bits and in the best case 9 bits of precision. This analysis is based on drawn transistor dimensions making exact precision characterization following fabrication difficulty.

Figure 9:
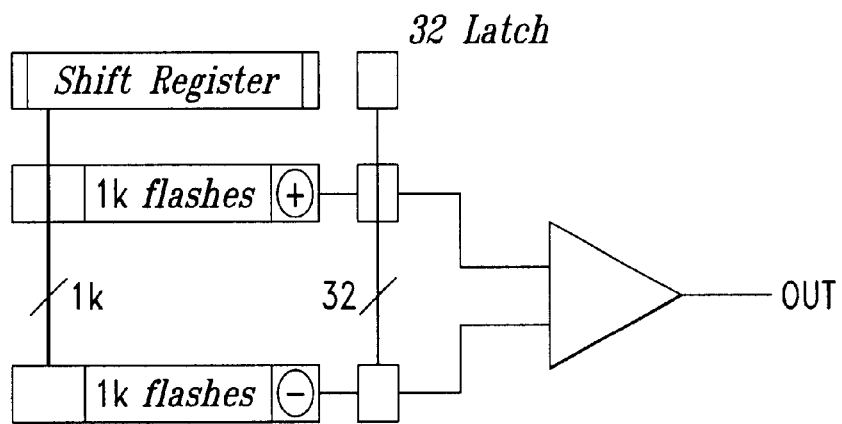
FIG. 9 shows a block diagram of a new test structure.

Another test structure is realized to estimate the computing precision of the neuron comparator in FIG. 9. The test structure contains 1 k flash devices (0.81 $\mu$m/2 $\mu$m) for common mode input whose inputs are controlled by a shift register and 32 flash devices for differential input whose inputs are controlled by a latch. The test structure circuit also contains programming and erasing drivers for the flash devices. The entire 1 k flash devices represents the common mode signal for the positive and the negative synapses; 16 compensation flash devices are able to compensate the programming error and the remaining 16 input flash devices are used to apply the input signal to measure the overall precision. After all the flash devices have been programmed to Vt=2.5 V, the shift register is filled with "1" s. A gate voltage is fixed for all the flash devices to Vt +$V_{LSB}$. Applying a Vt+$V_{LSB}$ voltage to the flash gate devices means fixing a common mode signal for the positive and the negative synapses (as has been done by the big transistors of the previous test structure). After compensation, a sequence of "001 10011. . . " is applied to 1 to 16 of the inputs testing for the correct output over 1 million cycles.

Figure 11:
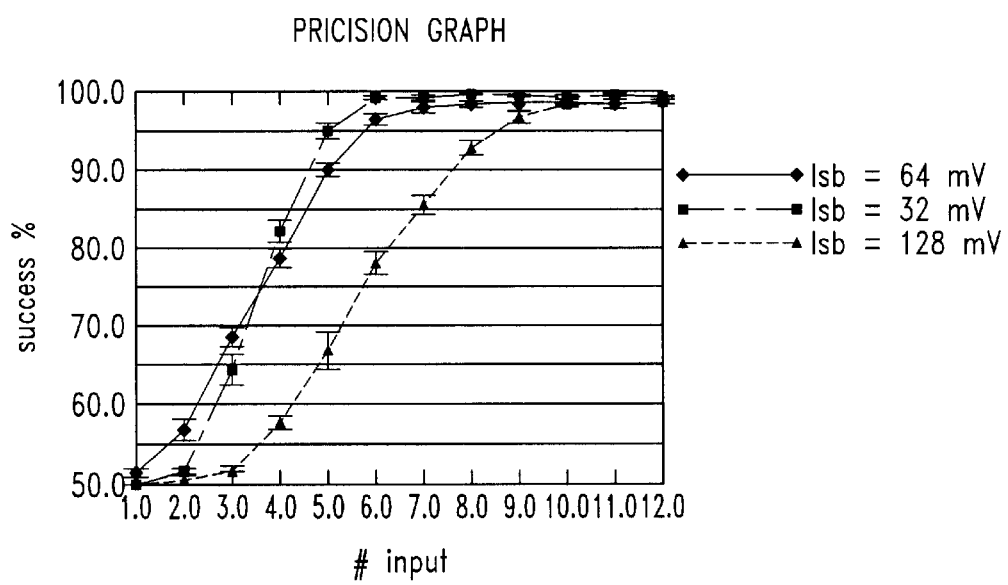
FIG. 11 shows a precision curve with 1 k devices of common mode.
Figure 12:
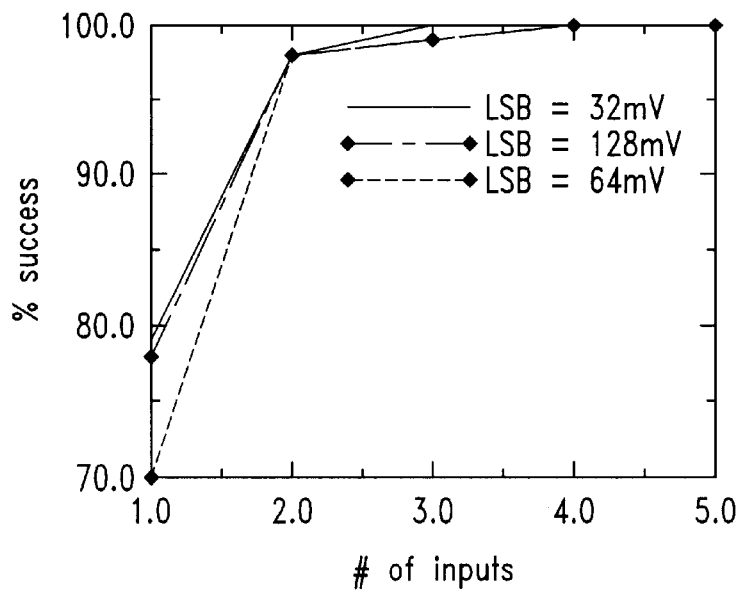
FIG. 12 shows a precision curve with 0.5 k devices of common mode.
Figure 13:
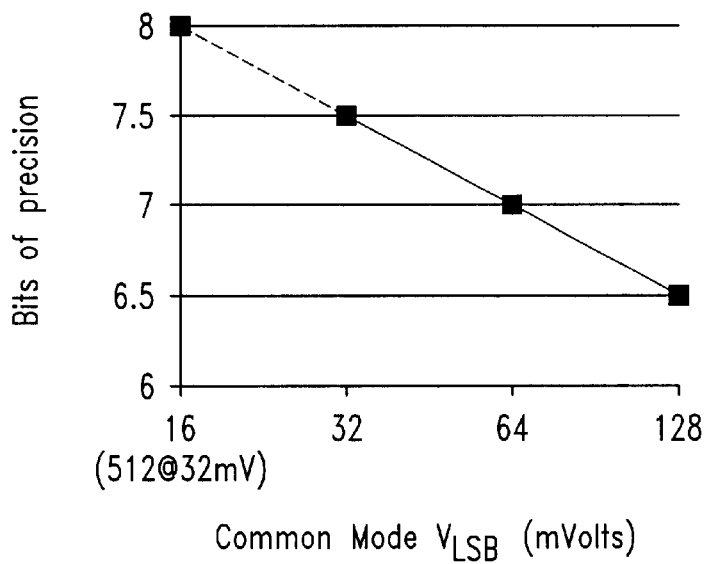
FIG. 13 shows bit precision curve versus LSB voltage for 1 k devices of common mode.

FIG. 11 shows the percentage of correct output as a function of the number of inputs applied (1 to 16). It is clear that as the number of inputs increases the percentage of correct outputs increases, approaching 100% for 6 inputs with a $V_{LSB}$=32 mV. This corresponds to a precision of 7+ bits. FIG. 13 shows the precision as a function of the LSB voltage. As can be seen, increasing the LSB voltage to 128 mV, 1 bit of precision is lost. The effective precision of the circuit depends on the common mode signal. FIG. 12 shows the same test using only 0.5 k flash devices (reduced common mode) In this case, the differential input needed for 100% correct output is 2 synapses 15 or 17 being on and the effective precision is close to 8 bits.

Figure 14:
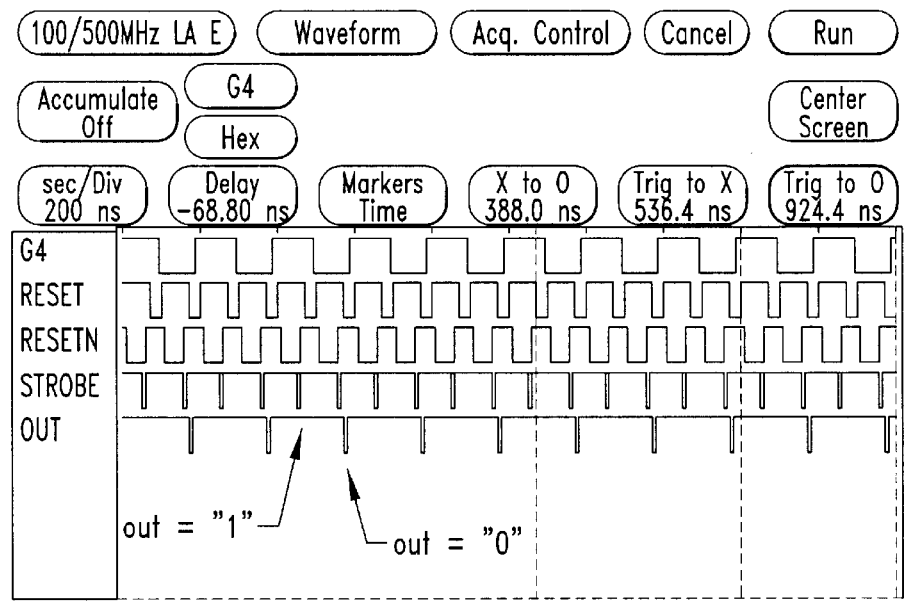
FIG. 14 is a diagram of neuron functionality at 10 MHz.
Figure 15:
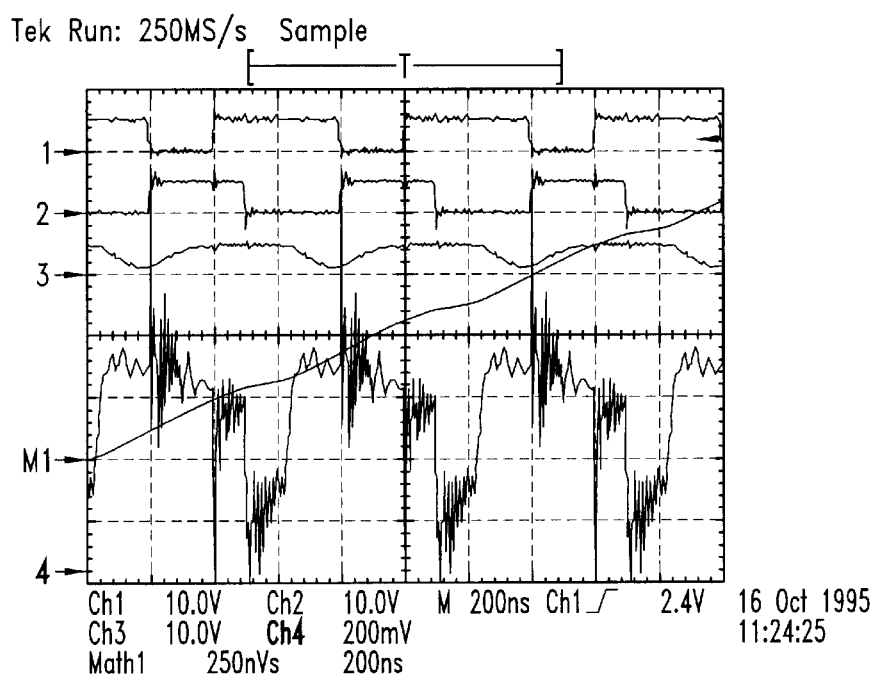
FIG. 15 is a power consumption measurement driven by a 1.7 MHz clock with a 5 volt power supply. Integrated supply current through a 9 k Ohm resistor is shown.

FIG. 14 shows a measurement of the neuron functionality clocked at 10 MHz. FIG. 15 shows power consumption of the neuron over one computation. The consumption is equal to 166 pJ at 5 V of power supply at a frequency of 1.7 MHz. This corresponds to 166 pJ per input multiply-accumulate operation (1 k inputs).

Clearly, changes may be made to the neural network as described and illustrated herein without, however, departing from the scope of the present invention. A number of alternative embodiments have been described herein for implementing a conductance synapse in a neuron. The invention is to be interpreted broadly, covering all embodiments and modifications thereof which fall within the scope of the appended claims.

What is claimed is:

1. A neural network comprising:
    a plurality of synaptic weighting elements organized in a first set and a second set, each having a respective programmable conductance, each of the synaptic weighting elements having a respective synaptic input connection for receiving an input signal and an output connection;
    a neuron stage coupled to the synaptic weighting elements;
    a conductance comparing circuit within the neuron stage, the conductance comparing circuit comparing the conductance of the first set of synaptic weighting elements to the conductance of the second set of synaptic weighting elements and outputting an indication of which set has the higher conductance without determining the conductance values; and
    a latch stage coupled to the neuron stage to digitize the outputted indication.

2. The network according to claim 1 wherein the synaptic weighting elements include a nonvolatile memory cell having a floating gate and a control gate in a programmable conductance.

3. The network according to claim 1, further including:
    an exciting conductive input terminal coupled to the conductance comparing circuit;
    an inhibiting conductance input terminal coupled to the conductance comparing circuit;
    a connection between the first set of the synaptic elements and the exciting conductive input terminal; and
    a connection between the second set of synaptic elements and the inhibiting conductive input terminal, the conductance comparing circuit outputting an indication of the results of the comparison between the exciting synaptic elements and the inhibiting synaptic elements.

4. A neural network comprising:
    a plurality of exciting synaptic elements having a programmable conductance;
    a plurality of inhibiting synaptic elements having a programmable conductance;
    a neuron stage having a first and second conductance input connected to the exciting and inhibiting synaptic elements, respectively, the neuron stage including a comparing circuit for providing a comparison of the conductance of the inhibiting synaptic elements and the exciting synaptic elements and generating an output signal indicative of which conductance is greater without determining the value of the conductance of the inhibiting synaptic elements and the exciting synaptic elements; and
    a latch stage coupled to the neuron stage to digitize the output signal.

5. A neural network comprising:
    a plurality of exciting and inhibiting synaptic weighting elements having a respective programmable conductance;
    a neuron stage coupled to the plurality of exciting and inhibiting synaptic weighting elements, each of the synaptic weighting elements having an associated exciting or inhibiting conductance and an input connection terminal for receiving a respective input signal and an output coupled to the neuron stage, the neuron stage further including a conductance sensing circuit that generates an output signal indicative of which of the total exciting and inhibiting conductances of the plurality of synaptic weighting elements is greater without determining the actual value, collectively and individually, of the exciting and inhibiting conductances; and a latch stage coupled to the neuron stage to digitize the output signal.

6. A neural network comprising:

a plurality of exciting synaptic weighting elements, each having a respective programmable conductance, each of the exciting synaptic weighting elements having output terminals which are connected in common to each other to provide an output which is the sum of the conductances of all the exciting synaptic weighting elements;

a plurality of inhibiting synaptic weighting elements, each having a respective programmable conductance, each of the inhibiting synaptic weighting elements having output terminals which are connected in common to each other to provide an output terminal having an output which is the sum of the conductances of all the inhibiting synaptic weighting elements;

a neuron stage having an exciting input connected to the output of the plurality of exciting synaptic weighting elements and having an inhibiting input connected to the output of the plurality of the inhibiting synaptic weighting elements; and a conductance comparing stage for comparing the conductance between the sum of the exciting synaptic weighting elements and the inhibiting synaptic weighting elements without determining the value of the conductances and outputting a signal indicative of which of the sums of the respective pluralities of synaptic weighting elements has the greatest conductance.

* * * * *